3,255,183
PROCESS FOR THE REDUCTION OF A
FAWORSKII ESTER
William D. Lorentz and Ingemar B. Forsblad, Kalamazoo,
Mich., assignors to The Upjohn Company, Kalamazoo,
Mich., a corporation of Delaware
No Drawing. Filed Feb. 26, 1964, Ser. No. 347,348
15 Claims. (Cl. 260—239.5)

This invention relates to an improved process for the preparation of intermediates for corticoid steroid hormones, and is more particularly concerned with a novel method of reduction of Faworskii esters employed in the preparation of cortisone, hydrocortisone, prednisone, prednisolone, and the like.

This application is a continuation-in-part of copending application Serial No. 290,187, filed June 24, 1963, now abandoned.

One of the principal routes currently employed in the commercial production of steroids containing the full corticoid side chain, i.e., the grouping

involves:

(a) The conversion of a starting material having a side chain

to the corresponding Faworskii ester

wherein R is an alkyl radical, followed by (b) Reduction of the Faworskii ester to the corresponding alcohol,

and (c) Oxidation of the latter, in the form of an acylate, to yield the full corticoid side chain. (For the sake of simplicity, only the 17-side chain of Ring D is shown in the formulae.)

The various stages are accomplished by processes which are now well-known in the art. For example, stage (a) is accomplished by processes such as that described in U.S. Patent 2,790,814, stage (b) is accomplished by processes such as that described in U.S. Patent 2,781,343, and stage (c) is accomplished by processes such as those described in U.S. Patents 2,769,823, 2,769,824, 2,769,825 and 2,875,217.

The process outlined above is currently employed in the preparation of a whole series of corticoid hormones such as cortisone, hydrocortisone, prednisolone, 6α-methylprednisolone (Medrol), 6α-fluoroprednisolone (Alphadrol), 9α-fluorohydrocortisone, 9α-fluoroprednisolone, and the like.

The present invention is concerned with a valuable improvement in stage (b) of the aforementioned process which enables corticosteroids, such as those named above, to be produced more efficiently and at reduced cost.

The present invention consists, in its broadest aspect, in an improved process for the reduction of a Faworskii ester having in Ring D the following configuration:

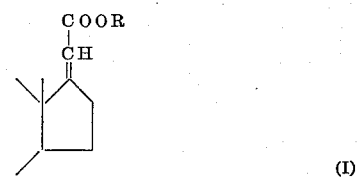

wherein R is a lower-alkyl group such as methyl, ethyl, propyl, butyl, pentyl, hexyl, and the like, preferably methyl, by reaction with diisobutyl aluminum hydride in the presence of an inert organic solvent, to produce the corresponding 21-alcohol having in Ring D the following configuration:

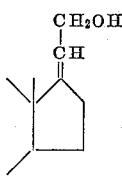

Currently, the reduction of the Faworskii ester in commercial production is accomplished using lithium aluminum hydride. The use of this reagent has a number of disadvantages. Illustratively, it is expensive, it is a solid which requires very careful handling due to its high reactivity and its ready decomposition in the presence of moisture, and special equipment is required for its use. It has now been found that diisobutyl aluminum hydride can be used as reducing agent in place of lithium aluminum hydride and that marked advantages are thereby obtained. Not only is the diisobutyl aluminum hydride much cheaper than lithium aluminum hydride, but the diisobutyl aluminum hydride produces a much faster reaction. Thus, in general, the reduction of the Faworskii ester can be accomplished using diisobutyl aluminum hydride in approximately one-fifth of the time required using lithium aluminum hydride.

Further, the use of diisobutyl aluminum hydride in the above reduction produces other unexpected and unobvious advantages in that it gives rise to less side reactions than does lithium aluminum hydride. Illustratively, in addition to the ester grouping, the 17,20-double bond in the Faworskii ester (I) is attacked by lithium aluminum hydride with the formation of the corresponding undesired 17,20-saturated compound. This side reaction can be reduced or suppressed by careful choice of solvents or reaction conditions but the use of these special conditions, for example, employment of low reaction temperatures and the use of special solvents, is a factor which contributes materially to the difficulty and expense of carrying out the reduction on the commercial scale.

A further side reaction brought about by lithium aluminum hydride occurs in those Faworskii esters (I) which contain an 11-keto group in the molecule. Illustrative of such Faworskii esters are methyl 3,11-diketo- 4,17(20)-cis-pregnadien-21-oate which is employed as intermediate in the manufacture of hydrocortisone, prednisolone, and the like, methyl 5α-hydroxy-6β-methyl-3,11-diketo-cis-pregn-17(20)-ene-21-oate, which is employed in the preparation of 6α-methylprednisolone, and 5α-hydroxy - 6β-fluoro-3,11-diketo-cis-pregn - 17(20)-ene-21-oate, which is employed in the preparation of 6α-fluoroprednisolone. Before carrying out the reduction of these Faworskii esters, the 3-keto group is protected in each case using conventional protecting groups, for example, a 3-alkylene ketal, such as the ethylene ketal, trimethylene ketal, and alkyl substituted ethylene and trimethylene ketals, such as 2,2-dimethyltrimethylene ketal, 2-methyltrimethylene ketal, propylene ketal, and the like, a 3-enamine such as the pyrrolidyl, 2,2-dimethylpyrrolidyl, 2,4-dimethylpyrrolidyl, 3-propylpiperidyl, 2-methylpyrrolidyl, 3,4-dimethylpyrrolidyl, 3-ethylpyrrolidyl, 3-isopropylpyrrolidyl, 3,3-dimethylpyrrolidylenamines, and the like, or a 3-lower-alkyl enol ether such as the methyl, ethyl, propyl, isopropyl, butyl, hexyl and cyclohexyl enol ethers and the like. Reduction of the Faworskii ester with the protected 3-keto group then gives the corresponding 21-alcohol in which the 11-keto group has also been reduced to 11-hydroxy. Using lithium aluminum hydride as reducing agent, the major portion of the product so obtained has the 11-hydroxy in the β-configuration which is the desired isomer for use in the subsequent stages of corticosteroid synthesis. Depending on the conditions employed, the reduction product yielded by lithium aluminum hydride can also contain significant quantities of the undesired 11α-hydroxy isomer.

For example, in the case of reduction of the aforementioned methyl 3,11-diketo-4,17(20)-cis-pregnadiene-21 oate using lithium aluminum hydride, the reduction product contains a significant amount of the undesired 11α-isomer of 11,20-dihydroxy-4,17(20)-cis-pregnadien-3-one if the 3-keto is protected by a ketal or enol ether group during the reduction. On the other hand, if the 3-keto group of the same compound is protected by means of an enamine during the reduction, the resulting product is substantially free of 11α-isomer and can be employed in subsequent stages of the corticosteroid synthesis without further purification. However, it would be preferable, from the point of view of commercial production, to employ the readily formed and easily handled 3-ketal or 3-lower-alkyl enol ether of methyl 3,11-diketo-4,17(20)-cis-pregnadien-21-oate as starting material in the above reduction step since the corresponding 3-enamine is more difficult to produce and handle. The above limitation on starting materials, which can be employed using lithium aluminum hydride in the above reduction, is a problem of commercial significance which has hitherto been unsolved.

It has now been found that this difficulty can be eliminated by using diisobutyl aluminum hydride as reducing agent in the above step whereby there is obtained a product which contains no significant proportion of the undesired 11α-isomer whether the 3-keto protecting group is a ketal, an enamine or a 3-lower-alkyl enol ether. Thus, the more readily accessible and economical 3-ketal or 3-lower-alkyl enol ether of the starting material can be employed in place of the 3-enamine thereby producing a significant reduction in cost in the commercial operation of the reduction step.

Accordingly, for the various reasons given above, the process of the invention represents a significant contribution to the more efficient and economical commercial production of corticosteroids.

The process of the invention is carried out advantageously as follows. The reactants, namely, the Faworskii ester (I) and the diisobutyl aluminum hydride are brought together in the presence of an inert solvent such as benzene, toluene, xylene, diethyl ether, tetrahydrofuran, dioxan, and the like. The order in which the reactants are brought together is generally immaterial but in certain instances, for example, when methyl 5α-hydroxy-6β-methyl-3,11-dioxo-cis-pregn-17(20)-ene-21-oate cyclic 3-(2,2-dimethyl-trimethylene acetal) is employed as the Faworskii ester, it has been found preferably to add the reducing agent to the ester rather than vice versa in order to obtain optimum yields.

The reaction is conducted advantageously at a temperature within the range of about $-10°$ C. to about $+40°$ C. and preferably within the range of about $-5°$ C. to about $30°$ C.

The diisobutyl aluminum hydride is employed advantageously in the proportion of from about 3.5 moles to about 10 moles per mole of the Faworskii ester (as its 3-alkylene ketal or 3-enamine). Preferably, in order to obtain optimum yields of the corresponding 21-alcohol, the diisobutyl aluminum hydride is employed in the proportion of about 4.3 moles per mole of the Faworskii ester (as its 3-alkylene ketal, 3-lower-alkyl enol ether, or 3-enamine).

The reduction occurs very rapidly and the reaction is terminated as soon as the reduction is complete (as determined by infrared, papergram or other suitable analysis of a portion of the reaction mixture). The desired 21-alcohol is isolated from the reaction mixture by conventional procedures. Thus, any excess of diisobutyl aluminum hydride is decomposed by the addition of a carbonyl reagent, suitably ethyl acetate or the like loweralkyl alkanoate, followed by the addition of water and a lower-alkanol such as methanol, ethanol, and the like. The reaction mixture can then be concentrated and filtered to remove precipitated aluminum hydroxide and the desired 21-alcohol is isolated by evaporation of the filtrate. If desired, the product so obtained can be purified, for example, by recrystallization but is generally of sufficient purity to be carried forward to the next stage of the synthesis.

If desired, the hydrolysis of the 3-keto protecting group, i.e., the 3-alkylene ketal, 3-enol ether or 3-enamine, can be combined with the above isolation procedure so that the corresponding 21-alcohol having a free 3-keto group is obtained. This hydrolysis can be accomplished by conventional procedures, for example, in the case of the enamine by adding a slight excess of an alkali metal hydroxide, for example, sodium hydroxide, potassium hydroxide, and the like, to the reaction mixture after decomposition of the excess diisobutyl aluminum hydride. The hydrolysis can be completed by warming the reaction mixture to about 40° C. to about 50° C. for a short period. The subsequent working up of the reaction mixture is accomplished conveniently by adjusting the pH to about 5 to 7 by the addition of an acid such as acetic acid or mineral acid, concentrating the reaction mixture and isolating the crystalline material which separates. Purification of the free 21-alcohol so obtained can be effected, if desired, by conventional procedures, such as by recrystallization. Where the 3-keto group is protected by a 3-ketal or 3-enol ether group during the reduction, the 3-ketal or 3-enol ether can be hydrolyzed using a similar procedure to that described for the 3-enamine but replacing the aqueous alkali by aqueous acid such as sulfuric, hydrochloric, acetic and the like.

While the process of the invention is of broad applicability to the reduction of Faworskii esters having in Ring D the configuration (I), said process is of particular value in the reduction of the particular Faworskii esters named above which are currently employed on the commercial scale in the synthesis of corticosteroids which are of clinically proven value. The use of the improved process in the manufacture of said corticosteroids allow these compounds to be produced more efficiently and economically.

The following examples illustrate the best method contemplated by the inventors for carrying out their invention, but are not to be construed as limiting the scope thereof.

Example 1.—Synthesis of 11β,21-dihydroxy-4,17(20)-cis-pregnadien-3-one

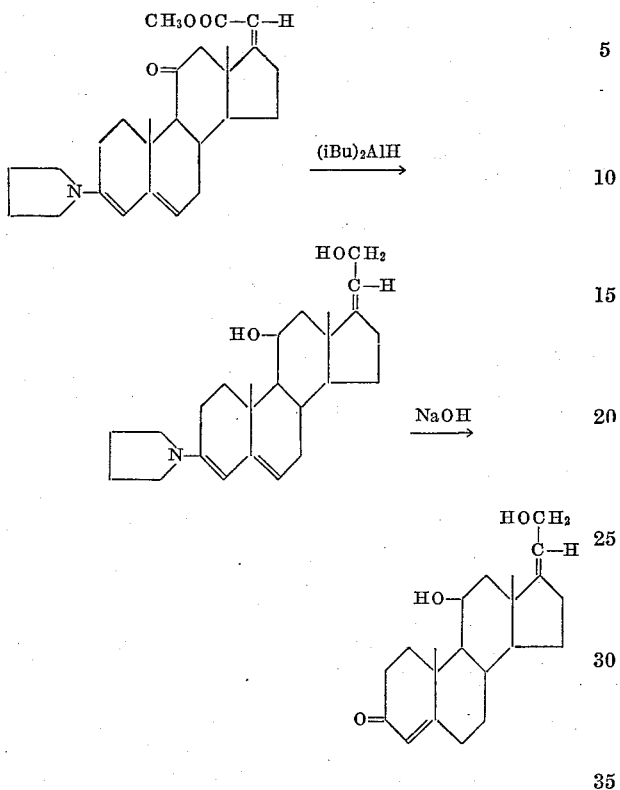

11.0 ml. (8.67 g.) of diisobutyl aluminum hydride (61.2 millimoles) and 10 ml. of ethyl ether were added to a nitrogen-purged flask. 5 g. of methyl 3,11-diketo-4,17(20)-cis-pregnadien - 21 - oate, 3-pyrrolidyl enamine (12.2 millimoles) dissolved in 20 ml. of benzene were added to the ether solution during one-half hour. Nitrogen atmosphere, stirring and a reaction temperature of 25 to 27° C. was maintained during the addition and during an additional reaction time of about 1 hour.

13.5 ml. of ethyl acetate was then added slowly at 25 to 30° C. followed by 20 ml. of water and 107 ml. of methanol. Then 47.6 g. of 50% aqueous sodium hydroxide in 447 ml. of water was added to hydrolyze the enamine. A temperature of 40° C. was maintained for 10 minutes before 32.5 ml. of acetic acid was added to bring the pH down to 5 to 7. The reaction mixture was concentrated under vacuum to about 200 ml. and 12.3 g. of sulfuric acid in 130 ml. of water was added. The crystals were filtered and washed with water (5.47 g. were obtained after drying). 2.0 g. of the crude product so obtained was recrystallized from benzene to give 1.46 g. of 11β,21-dihydroxy-4,17(20)-cis-pregnadien-3-one which corresponds to 99% chemical yield. Melting point; 157.0 to 162.0° C.: $[\alpha]_D+133$ (acetone).

Example 2.—Synthesis of 5α,11β,21-trihydroxy-6β-methyl-cis-pregn-17(20)-ene-3-one, cyclic (2,2-dimethyl-trimethylene acetal)

A 30.0 g. portion of 5α-hydroxy-6β-methyl-3,11-dioxo-cis-pregn-17(20)-ene-21-oic acid, methyl ester, cyclic-3-(2,2-dimethyl-trimethylene acetal) (63.2 millimoles) was dissolved in 400 ml. of dry benzene and 50 ml. dry ether and cooled down to 0° C. To the nitrogen-blanketed solution was added 49.0 ml. of diisobutyl aluminum hydride (273 millimoles or 4.33 moles/mole of steroid) during 40 minutes keeping the temperature between −5° C. and +5° C. After 1 hour of additional stirring time, 27 ml. of ethyl acetate was added followed by 500 ml. of methanol and 67 ml. of water. The solution was concentrated to about 500 ml. and the precipitated aluminum oxide was filtered off and extracted with acetone. The combined filtrate and extracts were evaporated to dryness in vacuo.

Yield: 97% (chemical) of 5α,11β,21-trihydroxy-6β-methyl-cis-pregn-17(20)-ene-3-one, cyclic (2,2-dimethyl-trimethylene acetal); M.P. 194 to 205° C., $[\alpha]_D$ −10° (chloroform).

Example 3.—Synthesis of 11β,21-dihydroxy-4,17(20)-cis-pregnadien-3-one cyclic ethylene ketal

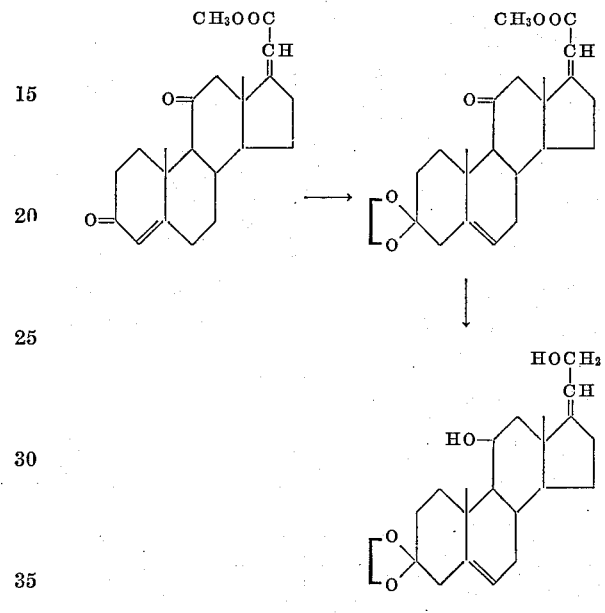

A mixture of 75 g. of methyl 3,11-diketo-4,17(20)-cis-pregnadien-21-oate, 3.2 g. of p-toluenesulfonic acid, 154 ml. of ethylene glycol, and 1325 ml. of benzene was heated under reflux using a water trap. When elimination of water from the reaction mixture ceased, the latter was cooled to room temperature (circa 25° C.) and 8.25 ml. of pyridine was added. The resulting mixture was stirred for a short period and the layers were then allowed to separate. The benzene layer was isolated and washed twice with water before being evaporated to dryness. The residue was heated under reflux for 15 minutes with 300 ml. of methanol and the methanol solution was cooled to approximately 12° C. The crystals which separated were isolated by filtration, washed with methanol and dried in vacuo. There was thus obtained 66.7 g. of methyl 3,11-diketo-4,17(20)-cis-pregnadiene-21-oate cyclic ethylene ketal in the form of a crystalline solid having a melting point of 176.5 to 182° C.; $[\alpha]_D^{20}$ −5°.

A 20 g. portion of the latter material was added to a mixture of 265 ml. of benzene and 35 ml. of ether and the mixture was stirred and cooled to approximately 0° C. To the cold solution was added slowly with stirring 39 ml. of diisobutyl aluminum hydride, maintaining the temperature at approximately 0° C. When the addition was complete, the mixture was stirred for a further 30 minutes at 0° C. before adding 20 ml. of ethyl acetate, 25 ml. of methanol, and 100 ml. of water to terminate the reaction. The benzene layer was separated, washed with water, and evaporated to dryness under reduced pressure. The residue was extracted twice with 100 ml. portions of chloroform and the chloroform extracts were combined and evaporated to dryness. There was thus obtained 18.70 g. (100% yield) of 11β,21-dihydroxy-4,17(20)-cis-pregnadiene-3-one cyclic ethylene ketal having a melting point of 168 to 181° C.; $[\alpha]_D$ −36° (chloroform).

*Example 4.—Synthesis of 11β,21-dihydroxy-4,17(20)-cis-pregnadien-3-one*

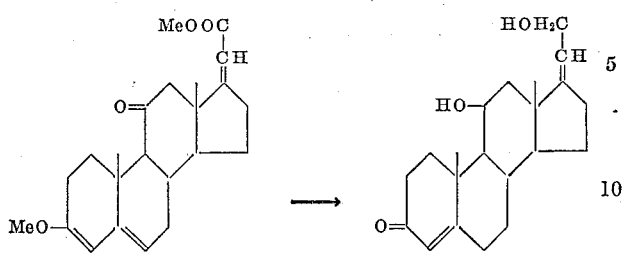

A solution of methyl 3-methoxy-11-keto-3,5,17(20)-cis-pregnatriene-21-oate (Campbell et al., J. Amer. Chem. Soc. 81, 4072, 1959) [prepared from 25 g. of methyl 3,11-diketo-4,17(20)-cis-pregnadiene-21-oate] in 200 ml. of benzene was added with stirring to a mixture of 180 ml. of tetrahydrofurane and 56.4 ml. of diisobutyl aluminum hydride at 10 to 20° C. To this mixture was subsequently added 10 ml. of ethyl acetate, 654 ml. of methanol and 240 ml. of 50% acetic acid, holding the temperature below 25° C. After 5 hours at reflux, 300 ml. of $H_2O$ was added and the mixture was concentrated down to a thick slurry. An additional 500 ml. of water was then added. The mixture was cooled to about 25° C. and the solid which separated was filtered, washed with water and dried. There was thus obtained 21.9 g. (=94.5% yield) of 11β,21-dihydroxy-4,17(20)-cis-pregnadien-3-one. Thin layer chromatography showed essentially only one spot corresponding to the desired compound.

We claim:

1. In a process for the reduction of a steroid of the pregnane series having in Ring D the following configuration:

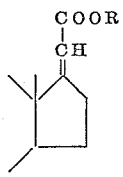

wherein R is lower-alkyl, to produce the corresponding 21-alcohol having in Ring D the following configuration:

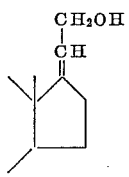

the improvement which comprises carrying out the reduction using diisobutyl aluminum hydride in the presence of an inert organic solvent.

2. In a process for the reduction of 3,11-diketo-4,17(20)-pregnadiene-21-oic acid lower-alkyl ester 3-(cyclic alkylene ketal) to produce the corresponding 3-keto-11β,21 - dihydroxy-4,17(20)-pregnadiene 3-(cyclic alkylene ketal) the improvement which comprises carrying out the reduction using diisobutyl aluminum hydride in the presence of an inert organic solvent.

3. The process which comprises reacting 3,11-diketo-4,17(20) - pregnadiene-21-oic acid lower-alkyl ester 3-(cyclic alkylene ketal) with diisobutyl aluminum hydride in the presence of an inert organic solvent, the diisobutyl aluminum hydride being employed in the proportion of from about 3.5 moles to about 10 moles per mole of steroid, whereby there is obtained 3-keto-11β,21-dihydroxy-4,17(20)-pregnadiene 3-(cyclic alkylene ketal).

4. In a process for the reduction of 3,11-diketo-4,17(20) - pregnadiene-21-oic acid lower-alkyl ester 3-enamine to produce the corresponding 3-keto-11β,21-dihydroxy-4,17(20)-pregnadiene 3-enamine, the improvement which comprises carrying out the reduction using diisobutyl aluminum hydride in the presence of an inert organic solvent.

5. The process which comprises reacting 3,11-diketo-4,17(20)-pregnadiene-21-oic acid lower-alkyl ester 3-pyrrolidylenamine with diisobutyl aluminum hydride in the presence of an inert organic solvent, the diisobutyl aluminum hydride being employed in the proportion of from about 3.5 moles to about 10 moles per mole of starting steroid, whereby there is obtained 3-keto-11β,21-dihydroxy-4,17(20)-pregnadiene 3-pyrrolidylenamine.

6. The process of claim 5 including the additional step of hydrolyzing the 3-keto-11β,21-dihydroxy-4,17(20)-pregnadiene 3-pyrrolidylenamine to obtain 3-keto-11β,21-dihydroxy-4,17(20)-pregnadiene.

7. The process of claim 5 wherein the starting enamine is methyl 3,11-diketo-4,17(20) - pregnadiene-21-oate 3-pyrrolidylenamine.

8. In a process for the reduction of 5α-hydroxy-6β-methyl-3,11-dioxo-cis-pregn-17(20)-ene-21-oic acid lower-alkyl ester 3-(cyclic alkylene ketal) to produce the corresponding 5α,11β-21 - trihydroxy-6β - methyl-cis-pregn-17(20)-ene-3-one 3-(cyclic alkylene ketal), the improvement which comprises carrying out the reduction using diisobutyl aluminum hydride in the presence of an inert organic solvent.

9. The process which comprises reacting 5α-hydroxy-6β-methyl-3,11-dioxo-cis-pregn - 17(20)-ene-21-oic acid lower-alkyl ester 3-(cyclic alkylene ketal) with diisobutyl aluminum hydride in the presence of an inert organic solvent, the diisobutyl aluminum hydride being employed in the proportion of from about 3.5 moles to about 10 moles per mole of starting steroid, whereby there is obtained the corresponding 5α,11β,21-trihydroxy-6β-methyl-cis-pregn-17(20)-ene-3-one 3-(cyclic alkylene ketal).

10. The process of claim 9 wherein methyl 5α-hydroxy-6β-methyl-3,11-dioxo-cis-pregn-17(20)-ene-21-oate cyclic-3-(2,2-dimethyltrimethylene acetal) is employed as starting material.

11. In a process for the reduction of the 3-cyclic alkylene ketal of a Faworskii ester having the formula:

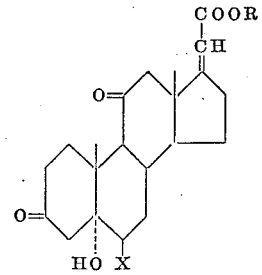

wherein R is lower-alkyl and X is selected from the class consisting of fluorine and methyl, to obtain the 3-cyclic alkylene ketal of the corresponding 21-alcohol having the formula:

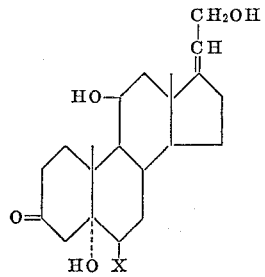

wherein X has the significance above defined, the improvement which comprises carrying out the reduction using diisobutyl aluminum hydride in the presence of an inert organic solvent.

12. In a process for the reduction of 3,11-diketo-4,17(20)-pregnadiene-21-oic acid 3-lower-alkyl enol ether to produce the corresponding 3-keto-11β,21-dihydroxy-4,17(20)-pregnadiene 3-lower-alkyl enol ether, the improvement which comprises carrying out the reduction using diisobutyl aluminum hydride in the presence of an inert organic solvent.

13. The process of claim 12 wherein the 3,11-diketo-4,17(20)-pregnadiene-21-oic acid 3-lower-alkyl enol ether employed as starting material is the 3-methyl enol ether.

14. In a process for the reduction of 3,11-diketo-4,17(20)-pregnadiene-21-oic acid 3-lower-alkyl enol ether to produce the corresponding 3-keto-11β,21-dihydroxy-4,17(20)-pregnadiene 3-lower-alkyl enol ether followed by acid hydrolysis of the latter to yield 3-keto-11β,21-dihydroxy-4,17(20)-pregnadiene, the improvement which comprises carrying out the reduction step using diisobutyl aluminum hydride in the presence of an inert solvent.

15. The process of claim 14 wherein the 3,11-diketo-4,17(20)-pregnadiene-21-oic acid 3-lower-alkyl enol ether employed as starting material is the 3-methyl enol ether.

No references cited.

LEWIS GOTTS, *Primary Examiner.*